United States Patent [19]

Rubertus et al.

[11] Patent Number: 4,994,939

[45] Date of Patent: Feb. 19, 1991

[54] UNIVERSAL LATTICE FOR MAGNETIC-ELECTRONIC ARTICLE SURVEILLANCE SYSTEM

[75] Inventors: Roland W. Rubertus, Hudson, Wis.; Roger K. Westerberg, Cottage Grove; Peter J. Zarembo, Shoreview, all of Minn.

[73] Assignee: Minnesota Mining and Manufacturing Company, St. Paul, Minn.

[21] Appl. No.: 437,074

[22] Filed: Nov. 15, 1989

[51] Int. Cl.[5] .............................................. H02B 1/01

[52] U.S. Cl. .................................... 361/429; 340/572

[58] Field of Search ........... 340/568, 572, 280, 258 R, 340/258 C, 553; 343/6.8 R, 6.8 LC, 177, 221, 459, 461, 588, 716; 52/220, 221, 459, 461, 588, 716; 174/68 C; 361/108, 429; D10/104

[56] References Cited

U.S. PATENT DOCUMENTS

| | | | |
|---|---|---|---|
| D. 291,976 | 9/1987 | Alward et al. | D10/121 |
| 4,135,183 | 1/1979 | Heltemes | 340/572 |
| 4,509,039 | 4/1985 | Dowdle | 340/572 |
| 4,677,799 | 7/1987 | Zarembo | 52/220 |

*Primary Examiner*—Leo P. Picard

*Assistant Examiner*—Donald A. Sparks

*Attorney, Agent, or Firm*—Donald M. Sell; Walter N. Kirn; William B. Barte

[57] ABSTRACT

A universal lattice assembly for use in a magnetic type electronic article surveillance system is disclosed which comprises a frame formed of two identical molded plastic half-shells, a metal chassis within which specific electronic sub-assemblies may be positioned and a coil assembly including a drive coil and a sense coil. The housing is adapted to enclose and to interlock and index the chassis, while also rigidly anchoring the coil assembly within an extensive cavity to prevent unwanted movement of the coil. A null adjustment mechanism within the frame enables a slight precise displacement of a coil to enble nulling of the two coils with respect to each other. Upon insertion of the coil assembly and chassis within the half-shells, the two are permanently pinned and bonded together to form an exceptionally rigid and durable composite lattice.

5 Claims, 6 Drawing Sheets

UNIVERSAL LATTICE FOR MAGNETIC-ELECTRONIC ARTICLE SURVEILLANCE SYSTEM

FIELD OF THE INVENTION

The invention relates to electronic article surveillance systems in which an alternating magnetic field is applied in an interrogation zone.

BACKGROUND OF THE INVENTION

Electronic article surveillance (EAS) systems, have in recent years, become increasingly commonplace. Such systems are now installed in a majority of academic and public libraries and are so common in retail stores as to not even cause a second look.

One type of EAS system in which alternating magnetic fields are employed, typically utilizes panels, or lattices on both sides of an exit way, thereby defining an interrogation zone through which protected articles bearing the EAS markers must pass. Both drive coils and sense coils are generally located within each lattice. Thus, when the drive coils are appropriately energized, an alternating magnetic field is created in the zone, and the presence of a marker creates a response in the sense coils. As the drive coils are energized while marker produced signals are being sensed, it is particularly important that the respective drive and sense coils in a single lattice be nulled with respect to each other, thereby minimizing inductive coupling between the respective coils. As the null condition is affected by both ferrous objects near the lattice and by ambient electric currents, it is further important that the null condition be adjustable during installation. Also, as such systems may be installed by only partially trained personnel under severe time constraints in retail stores and the like where customer traffic and extended store hours make access to the equipment by service personnel more restricted, and yet potentially subject the equipment to physical impact, it is likewise important that the lattices be simple to install, easy to adjust and rugged enough to stay in adjustment over protracted periods. Lattices typically provided in prior magnetic EAS systems, while recognizing many of the above problems, have failed to provide lattices which both avoid the problems and do so at a commercial cost acceptable to most retail merchants. This is, at least partially, due to the fact that prior art magnetic EAS systems have been designed to use at least a pair of complementary lattices, each somewhat different from the other, so that extensive assembly was necessary upon installation at a user site.

SUMMARY OF THE INVENTION

In contrast to lattices supplied with prior art magnetic EAS systems, the present invention is directed to a universal, rugged magnetic EAS lattice.

The universal lattice of the present invention first comprises a structural chassis having a bottom section adapted to be rigidly secured to a floor mounted base, a top section spaced from and parallel to the bottom section, and opposing parallel side sections rigidly secured to opposite ends of the top and bottom sections. The chassis further includes bosses, flanges and the like for indexing and interlocking the chassis with other members of the assembly. The chassis thus forms a rigid framework within which electronic sub-assemblies may be mounted.

The lattice assembly also includes a coil assembly comprising a drive coil and sense coil, at least one of which has a figure-8 configuration, and a frame which encloses the chassis and coil assembly and results in the formation of a rigid composite assembly. This result is obtained as the frame has opposite spaced apart legs, lower extending portions of which enclose and are indexed, interlocked and bonded to the chassis, while upper extending portions of the legs are connected at the upper extremity to a top horizontal section and at a lower point to a lower horizontal section. Finally, the frame includes a centermost vertical section connected between the top and lower horizontal sections. This upper portion of the frame has an interior cavity extending therethrough, within which the coil assembly is securely positioned so as to prevent any unwanted movement of the respective drive and sense coils.

A further construction within the center vertical part of the frame enables a controlled, but limited horizontal movement of the crossover portion of the figure-8 coil, thereby enabling that coil to be nulled with respect to the other coil.

Preferably, the frame comprises two identical molded plastic half-shells adapted to be mated and bonded together, thereby enclosing the chassis and coil assembly. Each shell thus provides one half of the aforementioned cavity, and includes positioning pins, flanges and the like for both stretching the coil assembly and for receiving it at numerous locations throughout the respective frame portions, for receiving and anchoring the chassis and for mating together and indexing the respective half-shells. The center vertical section of each half-shell also preferably includes projections, bosses and the like for receiving and mounting the coil nulling construction.

DETAILED DESCRIPTION

Figure 1:
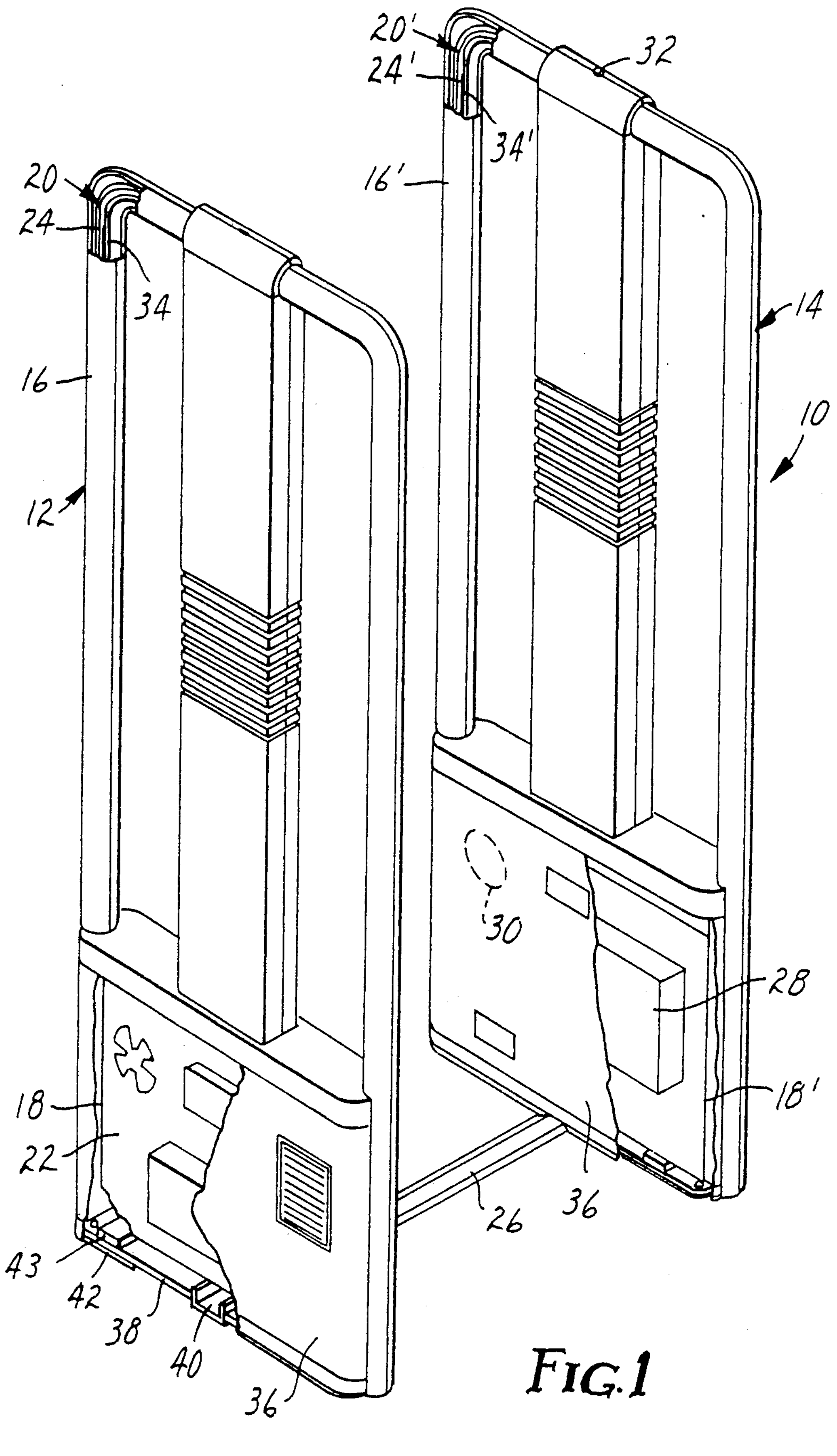
FIG. 1 is a partially cut away perspective view of a pair of lattices of a preferred embodiment of the present invention as used in a magnetic electronic article surveillance system installation.

FIG. 1 shows a partially broken away perspective view of a magnetic electronic article surveillance (EAS) interrogator according to a preferred embodiment of the present invention. As there shown, such an interrogator 10 comprises two universal lattice assemblies 12 and 14, which are identical to each other, and within which may be installed specific electronic sub-assemblies such that each of the lattice assemblies ultimately performs different functions. Each of the universal lattice assemblies 12 and 14 comprises a composite assembly consisting of a frame 16 or 16', a chassis 18 or 18', and a coil assembly 20 or 20'. Each of these respective components will be discussed in more detail with regard to subsequent drawings.

With respect to FIG. 1 it may further be noted that the assembly 12, nominally designated as being an amplifier lattice assembly, has installed within the chassis 18 an amplifier panel assembly 22. Such an assembly contains appropriate circuits to energize the drive coil 24 within the lattice 12 and via a cable within the raceway 26, the drive coil 24' within the lattice assembly 14, and appropriate peripheral components such as cooling fans, transformers, etc.

In a similar manner the lattice assembly 14 may be designated as a processor lattice assembly and therefore fitted with a processor panel assembly 28, which assembly typically includes a processor circuit and peripherals such as an audible alarm 30, diagnostic displays, a photocell, etc. and controls for an indicator light 32 located at the top of the assembly. Such a panel will then be coupled to the sense coil 34' and via a cable within the raceway 26 to the sense coil 34 within the lattice 12. Each of the panels are subsequently enclosed by covers 36. The respective lattice assemblies 12 and 14 are mounted via a base member 38 to a respective floor surface. Such a base unit 38 typically includes a centrally positioned portion 40 with electrical knockouts to provide access for incoming electrical power leads, and projections 42 contacting the floor surface, enabling the base to be mounted on a variety of floor coverings, carpets, tile and the like. Each assembly is bolted to a respective base unit through rubber pads 43. Depending upon the extent to which the pads are compressed, the lattice assemblies may be vertically aligned.

Figure 2:
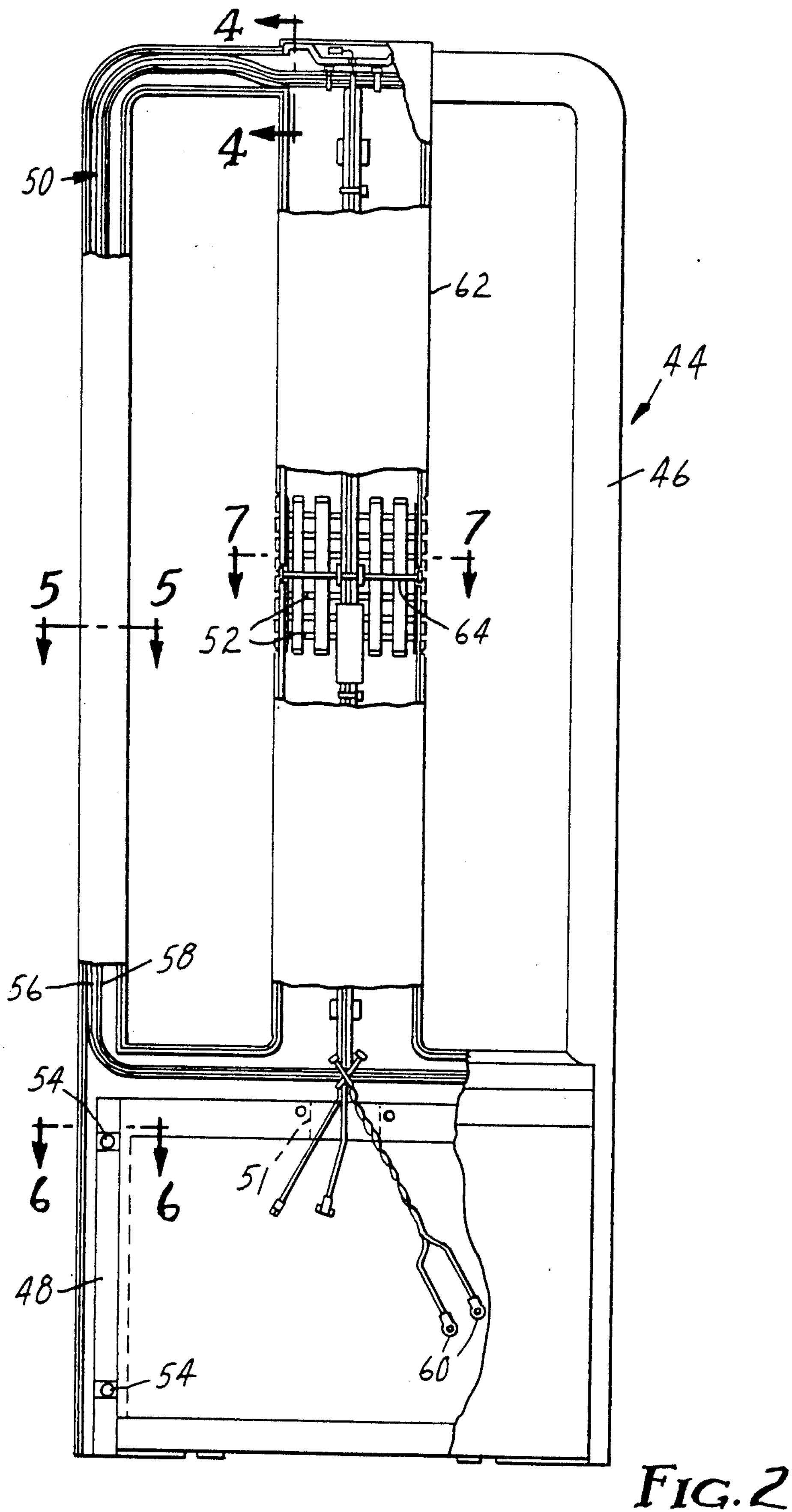
FIG. 2 is a partially cut away front view of a preferred lattice assembly of the present invention.

As shown in more detail in FIG. 2, each of the universal lattice assemblies 44 includes a frame 46, a chassis 48, and a coil assembly 50. The chassis 48 is preferably made of welded aluminum channels having a U-shaped cross-section, open on the interior to receive the respective electronic sub-assemblies. The chassis 48 has an open portion 51 in the top section to enable air received through vents 52 in the frame 46 in response to a fan, not shown, located within the amplifier panel assembly 22 within the frame 16 of FIG. 1. The chassis 48 is rigidly mounted within the frame 46 by means of the mounting bosses 54 located at various points around the chassis.

The coil assembly 50 may also be seen in FIG. 2 to comprise respective drive and sense coils 56 and 58. Preferably, the drive coil 56 is an O-configuration extending around the outer arms of the frame and terminating in leads 60. In contrast, the sense coil 58 has a generally figure-8 configuration and extends both around the outer arms as well as through the center or vertical portion 62 of the frame. Also positioned within that center portion 62 is a null adjustment mechanism 64 within which the sense coil is positioned.

Figure 3:
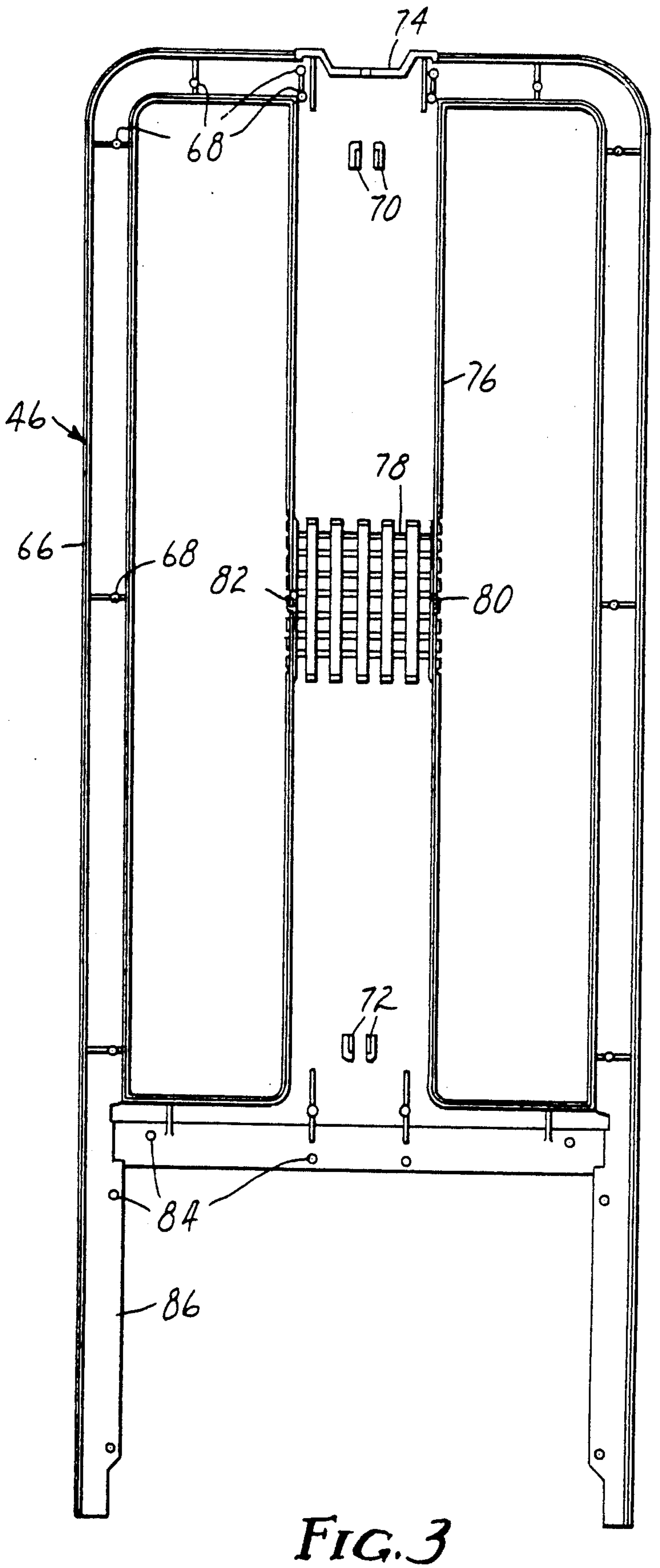
FIG. 3 is a front view of a half-shell of a lattice frame according to a preferred embodiment of the present invention.

Details of the frame 46 are shown in FIGS. 3-7. As there set forth, in a preferred embodiment each of the frame 46 is constructed of two identical half-shells, one of which 66, is shown in FIG. 3. Thus upon assembly, two such half-shells are bonded together so as to enclose both the chassis 48 and coil assembly 50 to form the integrated lattice assembly. Thus as shown in FIG. 3, the half-shell 66 includes an interior cavity which extends uninterruptedly through the upper halves of both outer legs and the interior vertical section. The coil assembly is firmly positioned alongside the mounting bosses 68 at numerous locations throughout the half-shell 66. The center vertical section includes mounting bosses 70 and 72 onto which may be mounted the coil support 110 as seen in more detail in FIGS. 8 and 9. The half-shell also includes an upper portion 74 over which may be mounted a respective cover, not shown, which may also include an indicator light as appropriate. The center vertical portion 76 is further provided with a vent 78 to allow clean air to be admitted therethrough and be drawn downward through an access hole in the chassis for cooling electronic componentry located in the lower portion of the assembly. Also within the center portion 76, are included mounting bushings 80 and 82 within which the nulling apparatus may be positioned. The respective edges of the center portion have alternating male and female mortices to prevent the half-shells from shifting during assembly. Finally, the frame 46 includes appropriate mounting bosses 84 and flanges 86 for receiving and mounting the chassis shown as element 48 in FIG. 2.

Figure 4:
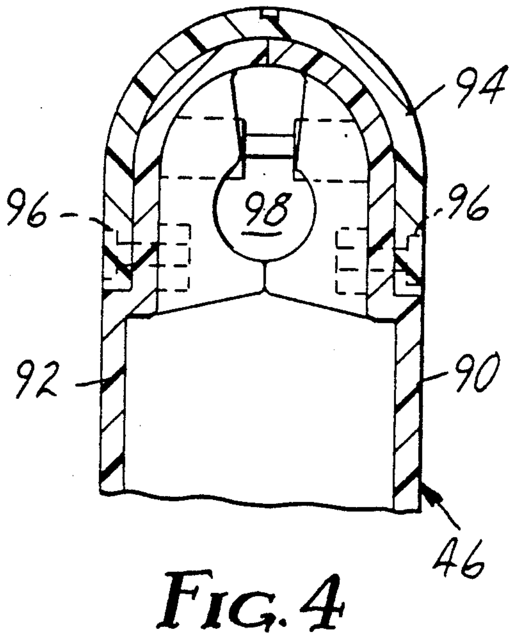

A section of the frame drawn along the line 4—4 of FIG. 2 is shown in FIG. 4. As there may be seen, each frame 46 comprises two half-shells 90 and 92 and a cover 94 secured to the respective half-shells by means of screws 96. For purposes of clarity, the coil assembly which would normally occupy the space 98 has been omitted.

Figure 5:
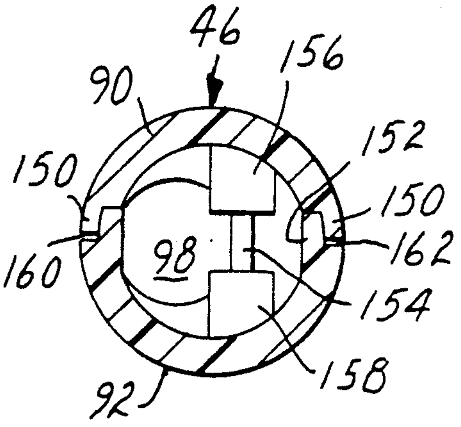
FIGS. 4–7 are enlarged sectional views of the half-shell taken along the lines 4—4, 5—5, 6—6 and 7—7, of the half-shell shown in FIG. 2.

The frame 90 is further shown in the cross-sectional view of FIG. 5, and as may there be seen, the half-shell 90 is constructed with exterior flanges adapted to mate with the interior flanges 152 of the half-shell 92. The respective halves are further shown to be assembled with a barbed pin 154 inserted into each of the respective bosses 156 and 158. When assembled such that the respective flanges are butted together, reveal lines 160 and 162 are formed to obscure any irregularities which may otherwise be formed in the seam, thereby improving the aesthetic appearance of the ultimate assembly. As in FIG. 4, the coil assembly has also been omitted for purposes of clarity, but would normally be placed within the cavity 98 and securely positioned therein via webs extending to the bosses 156 and 158.

Figure 6:
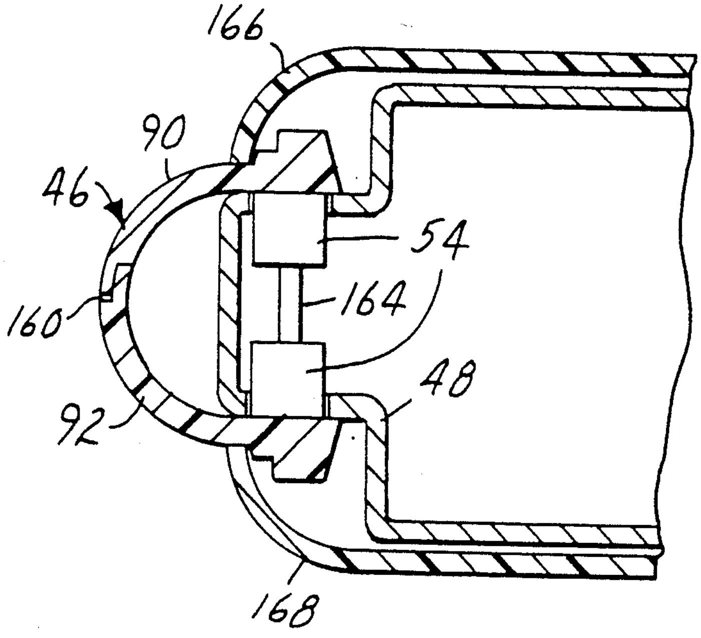

A still further cross-sectional view of the assembly shown in FIG. 2 is taken along the line 6—6 as shown in FIG. 6. As may there be seen, the frame 46, formed of the two identical half-shells 90 and 92, is assembled so as to enclose the chassis 48 via the bosses 54 which enter through matching holes to accurately index the chassis. The half-shells 90 and 92 are then held in place via a barbed pin 164. As in FIG. 5, the respective flanges meet on an internal surface to leave a reveal line 160, which obscures the actual seam and improves the aesthetics of the overall assembly. Once the lattice assembly is completed via the installation of appropriate electronic sub-assemblies within the chassis 48, the chassis is then enclosed via the addition of cover panels 166 and 168.

Figure 7:
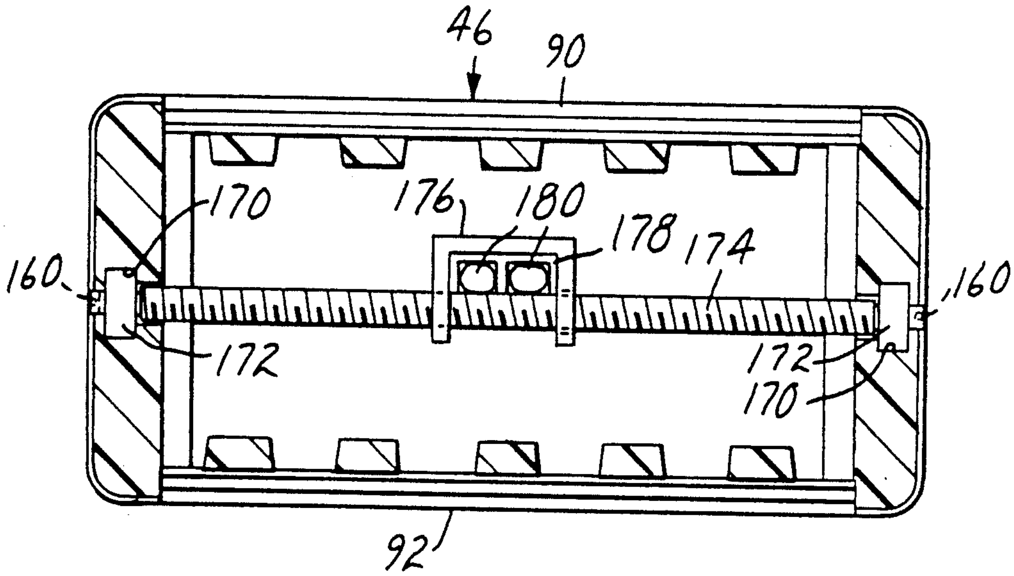

Finally, a cross-sectional view of the lattice assembly shown in FIG. 2 taken along the line 7—7 is shown in FIG. 7. As there shown, the center vertical portions of the frame, made of the identical half-shells 90 and 92, have mating flanges so as to leave the reveal line 160 extending along both edges, and have on the inside edge molded bushings 170 within which may be positioned restraining collars 172 which in turn support the threaded shaft 174 of the null adjustment mechanism. This shaft has a turned down portion inboard of each of the collars 172 to prevent lateral motion of the shaft 174. The shaft 174 is further adapted with a screwdriver slot or the like to which access is provided through a mating hole in the frame to enable rotation of the shaft 174. Further details of the null adjustment mechanism are shown in FIG. 7 to include a U-shaped screw follower member 176, one edge of which is threaded to the shaft 174. Within the member 176 is positioned a channel member 178 each end of which is secured within mounting bosses at the upper and lower portions of the center vertical portions of the frame. The sense coil 180 is positioned within and supported by the member 178.

Figure 8:
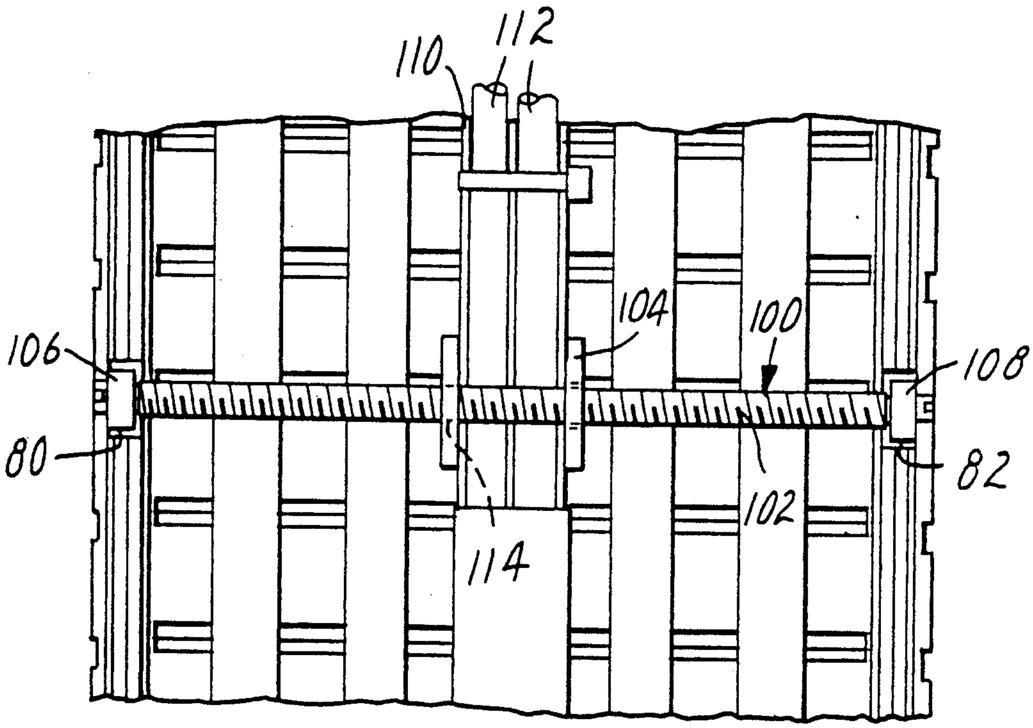
FIG. 8 is a detailed front view of the null adjustment mechanism preferably used in the lattice assembly of the present invention.

More complete details of the null adjustment mechanism are shown in the cross-section view of FIG. 8. As may there be seen, the mechanism 100 preferably includes a threaded shaft 102, which functions as a lead screw, an adjusting bracket 104 which functions as a screw follower, and restraining collars 106 and 108. The collars are mounted in the mounting bushings 80 and 82 as shown in FIG. 3. The adjusting bracket 104 is positioned to receive the coil support 110 which is securely strapped to the cable assembly 112, and forces controlled movement of the sense coil as the bracket is displaced. The bracket 104 is threaded on one end 114, such that as the threaded shaft 102 is rotated, the bracket moves horizontally to reposition the sense coil.

The sense coil is terminated in a two conductor cable, and that cable is in turn connected to a five conductor cable which makes up the sense coil. The sense coil thus consists of five turns, as each successive conductor within the five conductor cable is offset upon making one complete loop through the assembly to a successive conductor in the cable, the fifth conductor then being connected to the other terminal of the two conductor input cable.

Figure 9:
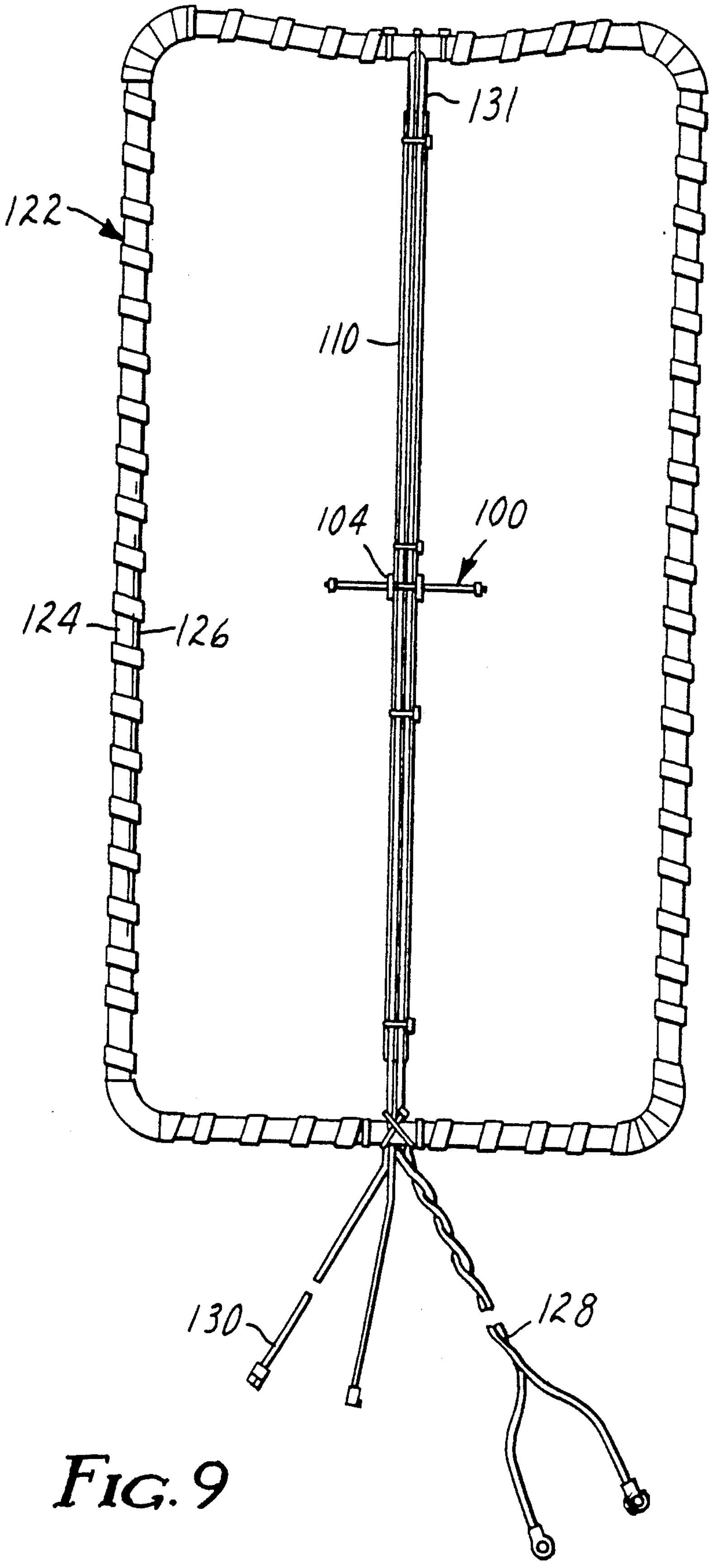
FIG. 9 is a front view of the coil assembly preferably used in the lattice assembly of the present invention.

Finally, details concerning the coil assembly 122 are set forth in FIG. 9. As may there be seen, the coil assembly 122 comprises a figure-0 drive coil 124 and a figure-8 sense coil 126. The drive coil 124 terminates at the leads 128, and extends around the outer periphery of the entire coil assembly. The sense coil 126 is terminated via the two conductor cable 130 and extends around the outer periphery of the assembly, while the center, crossover portions 131 of the sense coil 126 are securely positioned within a plastic extrusion 110, forming the support member to facilitate positioning the coil via the null adjustment mechanism as previously described. The entire coil assembly 122 is held together via windings of electrical tape and nylon cable wraps in a typical manner. The drive coil is preferably constructed of a number 8 AWG cable having 37 strands of 24 gauge wire individually insulated wire therein in a "Litz" construction, thereby providing consistent high and uniform impedance.

The lattice assembly of the present invention is particularly desirably provided and inventoried without the specific electronic sub-assemblies and covers in place, thereby decreasing the number of components which must be separately stocked. Upon receipt of an order for a particular EAS system configuration, whether it be for a one or two, etc. interrogation zone system, the requisite electronic sub-assemblies will be installed in the lattice assemblies and the covers put in place. The completed system is then in condition for shipping to a customer for installation.

During assembly of the lattices, one half-shell of the frame is desirably inserted into a fixture to prevent undue movement. The chassis is positioned onto the mounting bosses within the frame to cause it to be rigidly indexed in place, and the wiring harness is similarly positioned about the positioning bosses within the upper part of the half-shell. Barbed pins are inserted into mating bosses and epoxy adhesive is then desirably positioned along all mating surfaces of the housing. The opposite half-shell is then positioned and snapped into place, thereby providing a rigid composite assembly, which upon installation is firmly positioned in place so as to prevent accidental displacement and need for service adjustment.

What is claimed is:

1. A universal lattice assembly for use with magnetic electronic article surveillance systems comprising
   (a) a structural chassis having a bottom section adapted to be secured to a floor mounted base, a top section spaced from and parallel to the bottom section, and opposing parallel side sections rigidly secured to opposite ends of the top and bottom sections, and having means for indexing and interlocking the chassis with other members of the assembly, the chassis forming an open framework within which electronic sub-assemblies may be mounted;
   (b) a coil assembly comprising a drive coil and a sense coil, at least one of which has a figure-8 configuration, and
   (c) a frame having opposing spaced apart vertical legs, a top horizontal section connected across the top of the legs, a lower horizontal section connected between the legs and spaced upward of the bottom thereof, and a centermost vertical section connected between the top and lower horizontal sections, said frame having an interior cavity extending through said horizontal sections, said centermost vertical section and the portion of the legs between the horizontal sections and having means for receiving and rigidly anchoring said coil assembly in place, said centermost vertical section further comprising means for securing the crossover portion of the figure-8 coil and for controllably altering the horizontal displacement thereof to allow electrical nulling, the portions of each leg below the lower horizontal section being indexed, interlocked, and bonded, enclosing and coupled to the respective side section of said chassis, thereby enclosing said chassis to form a completed composite lattice assembly of high integral strength suitable for use in a hostile user environment.

2. An assembly according to claim 1, wherein said means for controllably altering the horizontal displacement of the crossover portion of the figure-8 coil comprises a threaded rod rotatably secured to said centermost vertical section and a screw follower threaded to said rod and having mounted thereto said coil crossover section.

3. An assembly according to claim 2, wherein said controllably altering means further comprises a relatively stiff support to which the crossover portion of the figure-8 coil is secured, opposite ends of said support being further secured near the top and bottom of the centermost vertical section to prevent lateral displacement of the coil at the ends, and the center portion of the support being secured to the screw follower, thereby allowing fine, continuous control over the vertical position of the crossover portion.

4. An assembly according to claim 1, wherein said centermost vertical section comprises a section having an extended cross-sectional area and a larger internal cavity, thereby affording a structured foundation for an overhead member designed to couple together two of said assemblies, air intake and flow duct work for directing the flow of clean incoming air therethrough to electrical components as may be located within said chassis.

5. An assembly according to claim 1, wherein said frame comprises two identical molded half-shells, each half-shell having means within the cavity for indexing and interlocking the coil assembly and chassis therewithin and for attaching the respective half-shells together.

* * * * *